United States Patent
Dewitt et al.

(10) Patent No.: US 11,440,268 B2
(45) Date of Patent: Sep. 13, 2022

(54) CUT-BOARD EDGE-SEALING METHOD

(71) Applicant: Royal Group, Inc., Atlanta, GA (US)

(72) Inventors: Andrew Wynn Dewitt, Melbourne, FL (US); Jeffrey Alan Dolan, Abingdon, VA (US); Brandon Sevier Nadler, Abingdon, VA (US); Rodney Lee Olinger, Saltville, VA (US)

(73) Assignee: Royal Group, Inc., Atlanta, GA (US)

( * ) Notice: Subject to any disclaimer, the term of this patent is extended or adjusted under 35 U.S.C. 154(b) by 64 days.

(21) Appl. No.: 16/911,024

(22) Filed: Jun. 24, 2020

(65) Prior Publication Data

US 2020/0316877 A1 Oct. 8, 2020

Related U.S. Application Data

(62) Division of application No. 15/267,337, filed on Sep. 16, 2016, now Pat. No. 10,730,245.

(60) Provisional application No. 62/220,281, filed on Sep. 18, 2015.

(51) Int. Cl.
| | | |
|---|---|---|
| *B29C 67/00* | (2017.01) | |
| *B29C 44/56* | (2006.01) | |
| *B29K 27/06* | (2006.01) | |
| *B29L 7/00* | (2006.01) | |
| *B29L 31/00* | (2006.01) | |
| *B29L 31/10* | (2006.01) | |
| *B29C 44/50* | (2006.01) | |
| *B29K 105/04* | (2006.01) | |

(52) U.S. Cl.
CPC ........ *B29C 67/004* (2013.01); *B29C 44/5636* (2013.01); *B29C 44/50* (2013.01); *B29C 67/0011* (2013.01); *B29K 2027/06* (2013.01); *B29K 2105/045* (2013.01); *B29L 2007/00* (2013.01); *B29L 2031/108* (2013.01); *B29L 2031/73* (2013.01); *B29L 2031/776* (2013.01)

(58) Field of Classification Search
CPC ............ B29C 67/0044; B29C 44/5636; B29C 43/3607; B29C 45/14418; B29C 65/00; B29C 53/54; B29C 55/20; B29C 65/1648; B29C 65/1651; B29C 66/137; B29C 70/302; B29C 70/76; B29C 70/763
See application file for complete search history.

(56) References Cited

U.S. PATENT DOCUMENTS 9,302,425 B1 * 4/2016 Dotson ................. B29B 13/023

* cited by examiner

*Primary Examiner* — Stella K Yi
(74) *Attorney, Agent, or Firm* — Polsinelli PC

(57) ABSTRACT

A method of automatically advancing a polymer cut-board, such as cellular polyvinyl chloride, through a stationary, non-spinning sealing element having a rounded or cylindrical surface that contacts and compresses a cut edge of the board to provide a sealed skin surface to the cut edge.

13 Claims, 8 Drawing Sheets

Fig_3

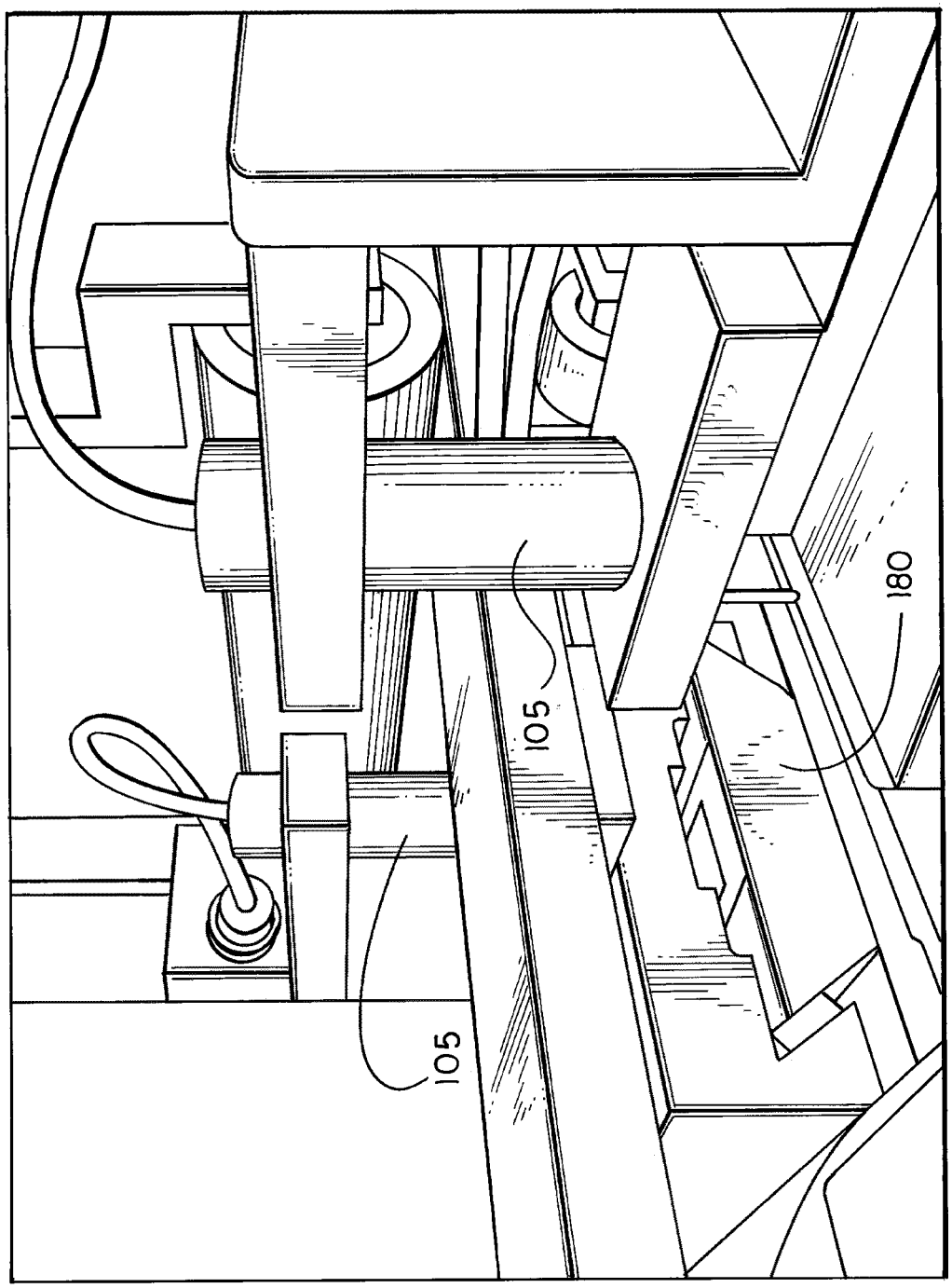

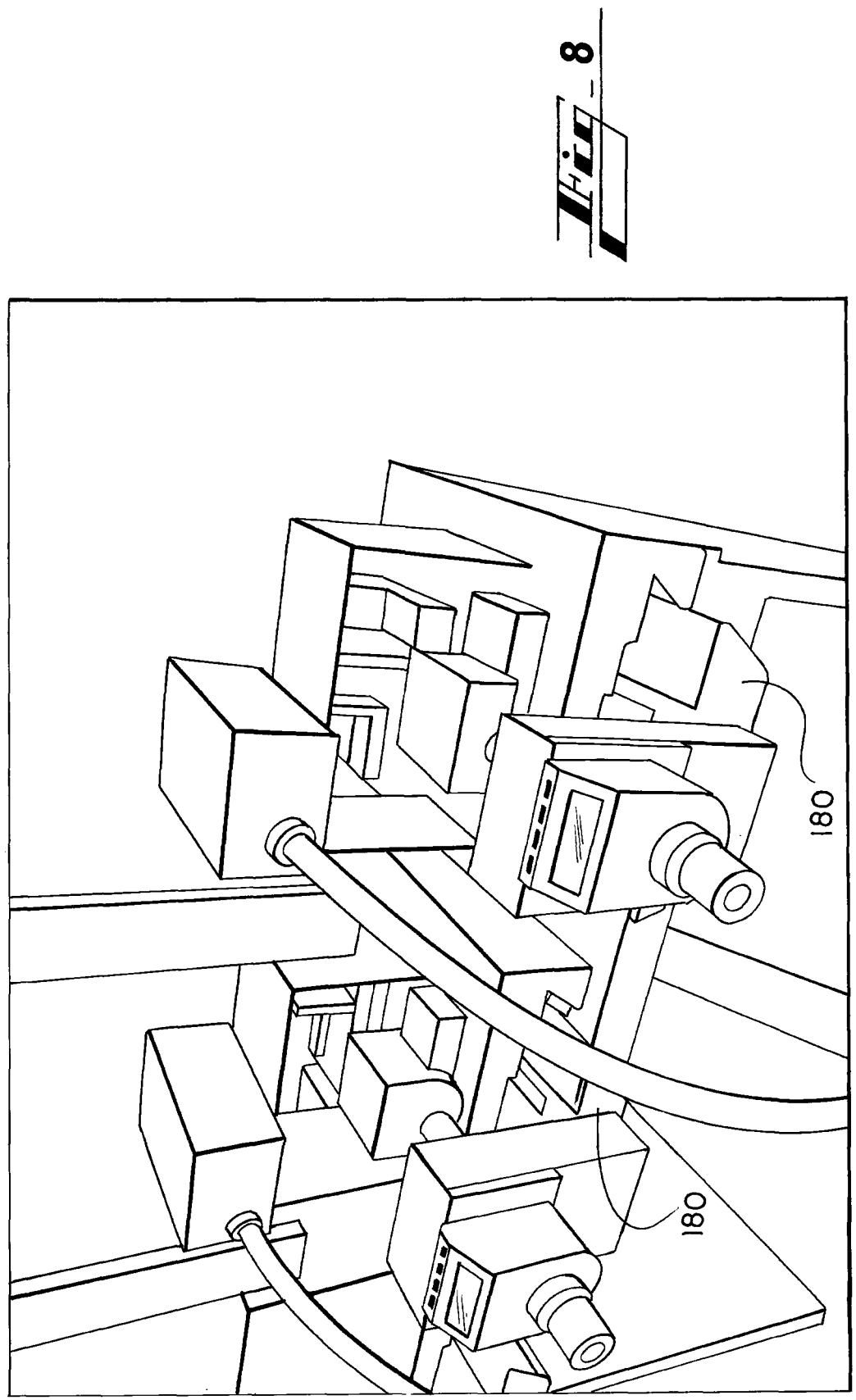

CUT-BOARD EDGE-SEALING METHOD

CROSS-REFERENCE TO RELATED APPLICATIONS

This application is a divisional application of U.S. non-provisional application Ser. No. 15/267,337, filed Sep. 16, 2016, now U.S. Pat. No. 10,730,245 issued Aug. 4, 2020, which claims the benefit of priority of U.S. provisional application No. 62/220,281, filed Sep. 18, 2015, which are all incorporated herein by reference.

BACKGROUND

Many of the cellular polyvinyl chloride (PVC) trim board manufacturers have used heated, rolling wheels to seal the edge of their trim boards, such as disclosed by U.S. Pat. No. 8,333,582 and published application US 2013/0099416 (both incorporated herein by reference). While such earlier process was an improvement from the un-sealed, open cell structure from the prior vintage of trim boards, the sealed edges from this process did not fully seal the surface, and did not provide an edge that was materially similar to the extruded top and bottom surface of the trim boards. The standard test to estimate how well the edge was sealed was "the pencil test". This included drawing a line with a graphite lead pencil and then attempting to erase the line with the pencil's eraser. Any open cell structure would capture graphite in the cells which could not be removed with the eraser and indicate that the surface was not fully sealed.

SUMMARY

To answer the deficiencies of prior sealing systems and methods, the present invention creates a sealed surface where all visible traces of graphite can be erased away. In addition, a more precise test of measuring the gloss level of the sealed edge versus the top and bottom of the trim board demonstrates that the sealed edge with this new technology more accurately approximates the extruded surface of the top and bottom of the trim board.

The present invention includes a system and method of sealing open cell structure resulting from cutting foamed polymer sheets into individual boards. Embodiments of the invention include multiple stationary sealing elements that can be operated from ambient temperature to elevated temperatures (wherein one or more pairs may apply heat). The edges of the board are routed or milled to ensure a flat, squared surface. The edges are then passed between stationary elements that apply pressure, creating friction as the board slides along the sealing elements. Some or all of the elements may be heated to cause softening, or melting of the outer most layer of material. Subsequent elements may operate at lower temperatures and higher pressures that freeze and cold work the outer layer of material. The resulting surface is a sealed, slightly textured surface similar to the uncut, extruded top and bottom surface of the board.

In embodiments of the invention, extruded PVC boards that have been cut along their length (and therefore have rough side edges) have the sides sealed by pulling the boards through a system that applies hot pressure from stationary bars abutting the rough sides of each PVC board. Specifically, most PVC trim board is manufactured by extruding 48" wide foamed PVC sheets which are then ripped (cut) into traditional wood trim widths, i.e., 1×4, 1×6, 1×8, etc. Where the boards are cut, the cut surface results in an exposed open cell surface, whereas the top and bottom surface which is not cut has a nice, smooth extruded skin. Most trim board manufacturers have now implemented "edge sealing" to somewhat melt and seal the cut edges to eliminate, or reduce the exposure of the open cell surface. For example, U.S. Pat. No. 8,333,582 and pending application published as US 2013/0099416 disclose using heated, rotating and motor-driven rollers to transport the material through the machine and melt and create a skin on the exposed surface.

By contrast, embodiments of the present invention include a system where the cut PVC boards are (1) pulled with a pulling machine (on unheated guide rollers) through stationary metal elements (ambient or heated) and friction, pressure and heat create a skin on the rough, exposed surface and (2) further pulled through a stationary spool (or other corner shaping element) that, while the new skin on the sides is still hot, presses the corners of the sides of the board into a desirable rounded corner shape (since it was found that simply creating the skin with hot elements led to the excess hot PVC moving to the corners and creating undesirable sharp corners).

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 7 illustrates a perspective view of a pair of sealing elements connected to dovetail guide blocks in one embodiment of the invention, FIG. 8 illustrates a perspective view of sealing elements and dovetail guide blocks provided on each side of a machine in one embodiment of the invention.

DETAILED DESCRIPTION OF PREFERRED EMBODIMENTS

The following description is intended to convey a thorough understanding of the embodiments by providing a number of specific embodiments and details involving a method and apparatus for manufacturing a decorated extruded profile. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Generally speaking, the various exemplary embodiments described herein relate to devices, systems and methods for sealing the edges of cut/ripped cellular polyvinyl chloride (PVC) boards 50. It will be appreciated that embodiments of the invention may be applicable to boards that comprise other polymer and plastic materials beyond cellular PVC.

The resultant articles may be useful in, for example, deck systems, fence systems, building products, floor coverings, or components thereof, such as planks, slats, rails, posts, flooring, siding, roofing materials, and the like. In addition, the articles may have many of the desirable properties of natural wood products, and may be sturdy, lightweight, and have excellent weatherability properties.

Figure 1:
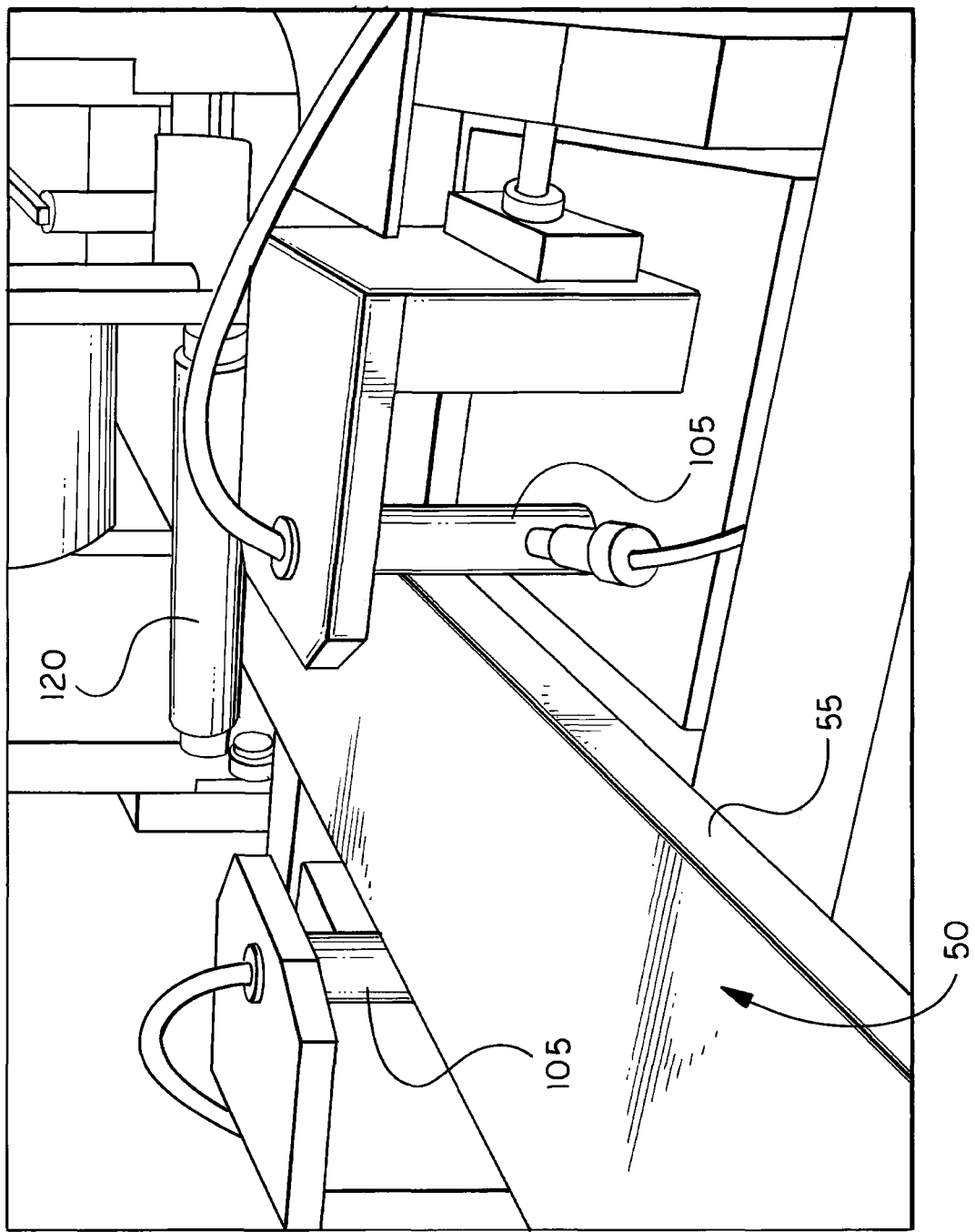
FIG. 1 illustrates a perspective view of a board with stationary side sealing units applying heat and a puller roller pulling the board, according to one embodiment of the invention.
Figure 2:
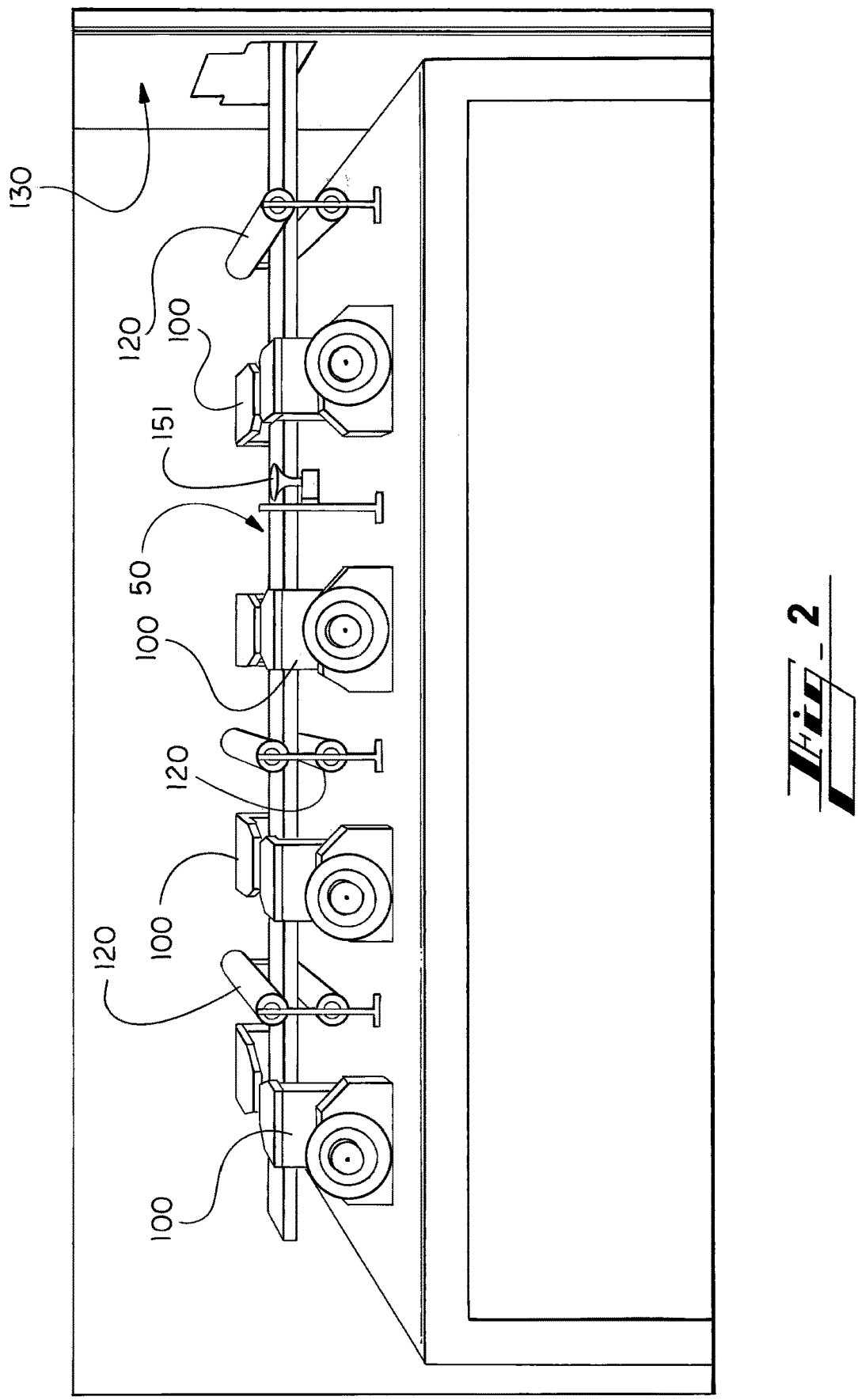
FIG. 2 illustrates a perspective view of a board with multiple pairs of stationary side sealing units and multiple puller rollers pulling the board, according to one embodiment of the invention.
Figure 3:
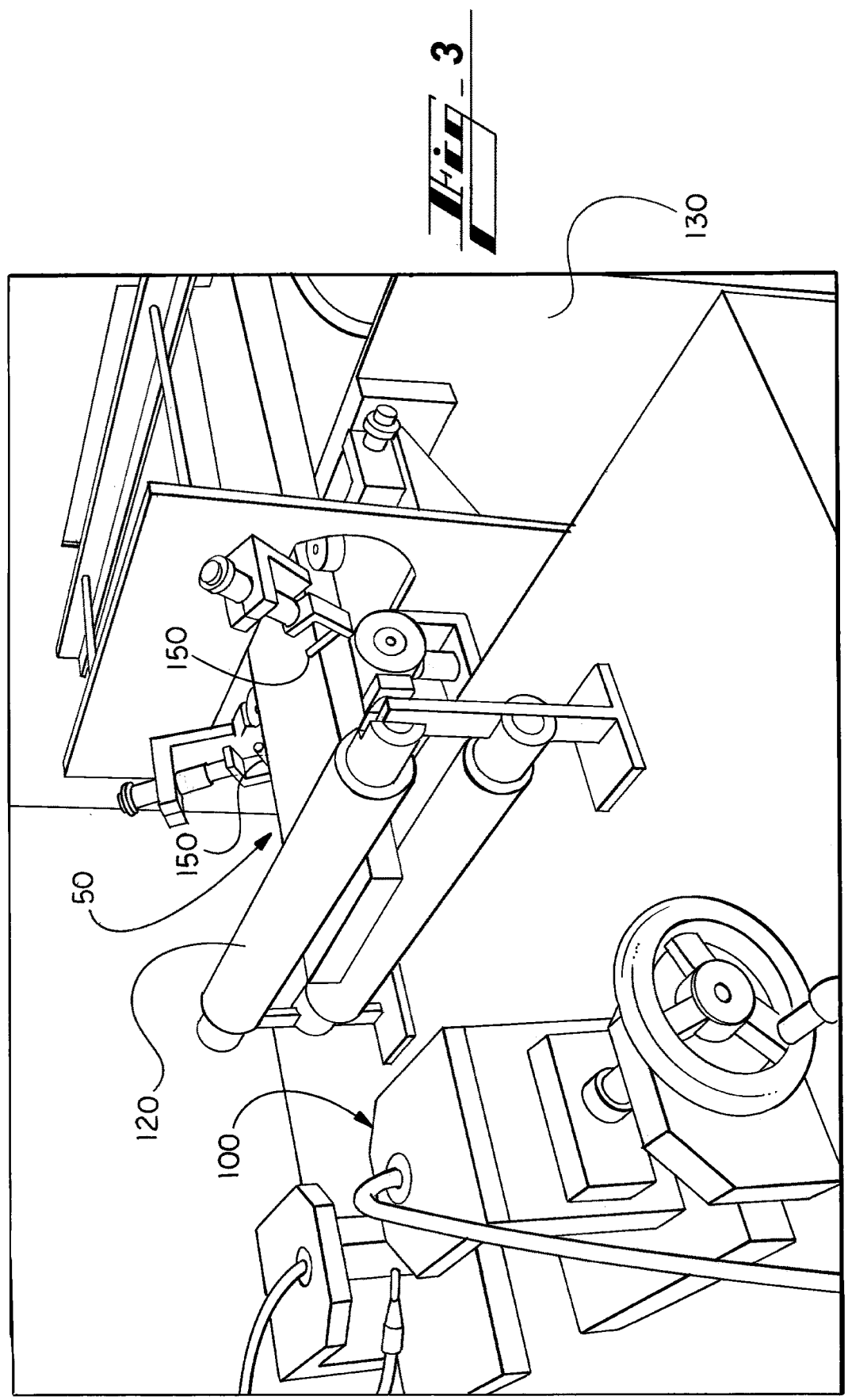
FIG. 3 illustrates a perspective view of a pair of angled corner shaping units pushing the warm corners of a board being pulled by puller roller after the board's exit from between a pair of stationary side sealing units in one embodiment of the invention.

As shown in FIG. 1, the present invention seeks to answer the need of extruded cellular PVC boards 50 that are cut and have rough edges for such edges (left and right side surfaces) 55 to be made smooth and approximate the look and gloss of the extruded top and bottom surfaces. In embodiments, as shown in FIGS. 2 and 3, the PVC boards 50 are pulled by a pulling machine 130 and advanced in line through puller rollers 120 for interaction with sealing head devices 100 having sealing units 105 that preferably have a smooth, rounded and/or cylindrical shape. In some embodiments a system of the invention further includes corner shaping devices 150 as shown in FIGS. 3-6.

In other embodiments it will be appreciated that push-machines, combinations of push and pull machines, conveyor systems and other board advancement techniques may be implemented to advance boards in an automated production line. It is preferable that boards be advanced in embodiments of the present in invention in a range of 20 fpm (feet per minute) to 200 fpm, and more preferably from 60 fpm to 200 fpm.

In various embodiments, pairs of sealing units 105 positioned across from one another at opposite edges 55 of the board 50 may preferably be heated to achieve desired results. Such heating may preferably range from about 115° F. to about 500° F. Different head devices 100 (which provide pairs of sealing units 105) may also be provided at different temperatures depending on variables such as the speed of advancement of the boards, the pressure (compression distance), desired results and other parameters. Preferably where a board 50 in the production line is fed above 60 fpm, such as tests conducted at 70 fpm, better edge sealing resulted where a first two pairs of sealing units were hotter (e.g. 475-500° F.) than a last two pairs of sealing units (e.g. 120-160° F.). It will be appreciated that in alternative embodiments, the rough board edges 55 might be heated by blowers or other heating elements to desirable temperatures and then passed through unheated stationary sealing units 105 whereby compression is applied to achieve sealing without a sealing unit necessarily providing the heat to the edges 55.

In some embodiments of the invention it was determined that sealing units 105 created sharp corners that could be viewed as undesirable in various applications for a PVC board 50. To provide more rounded corners to a board edge 55 sealed by the present invention, corner shaping elements 150 such as shown in FIGS. 3-6 are implemented. While such shaping elements 150 are preferably not necessary to be heated as the corner shaper 150 pushes the warm corners after leaving one or more pairs of heated sealing elements 105, in some embodiments the corner shapers 150 might be heated to provide a desired effect.

Figure 5:
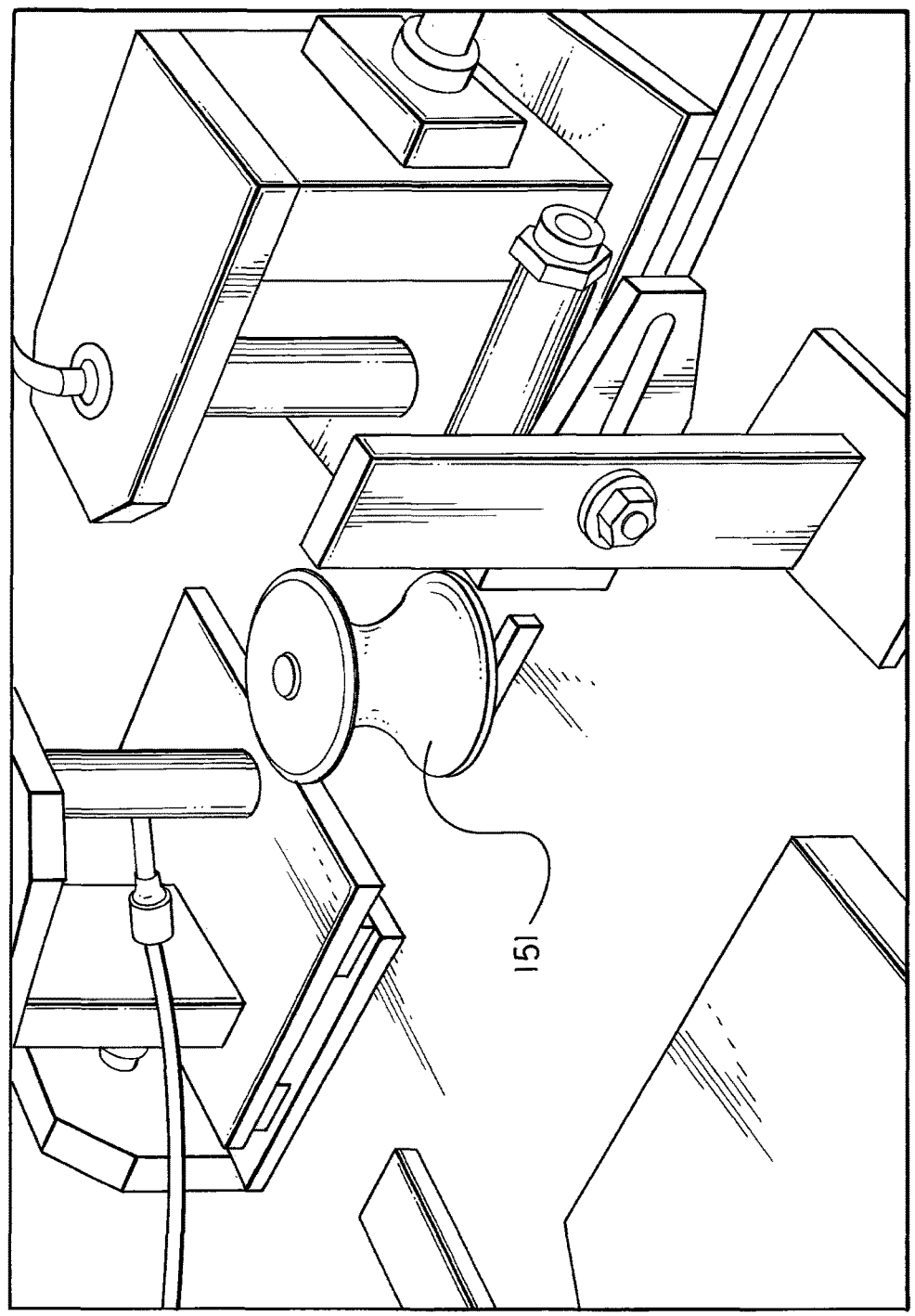
FIG. 5 illustrates a spool-shaped corner shaping unit as an alternative to angled rod units as shown in FIGS. 3 and 4 in one embodiment of the invention.
Figure 6:
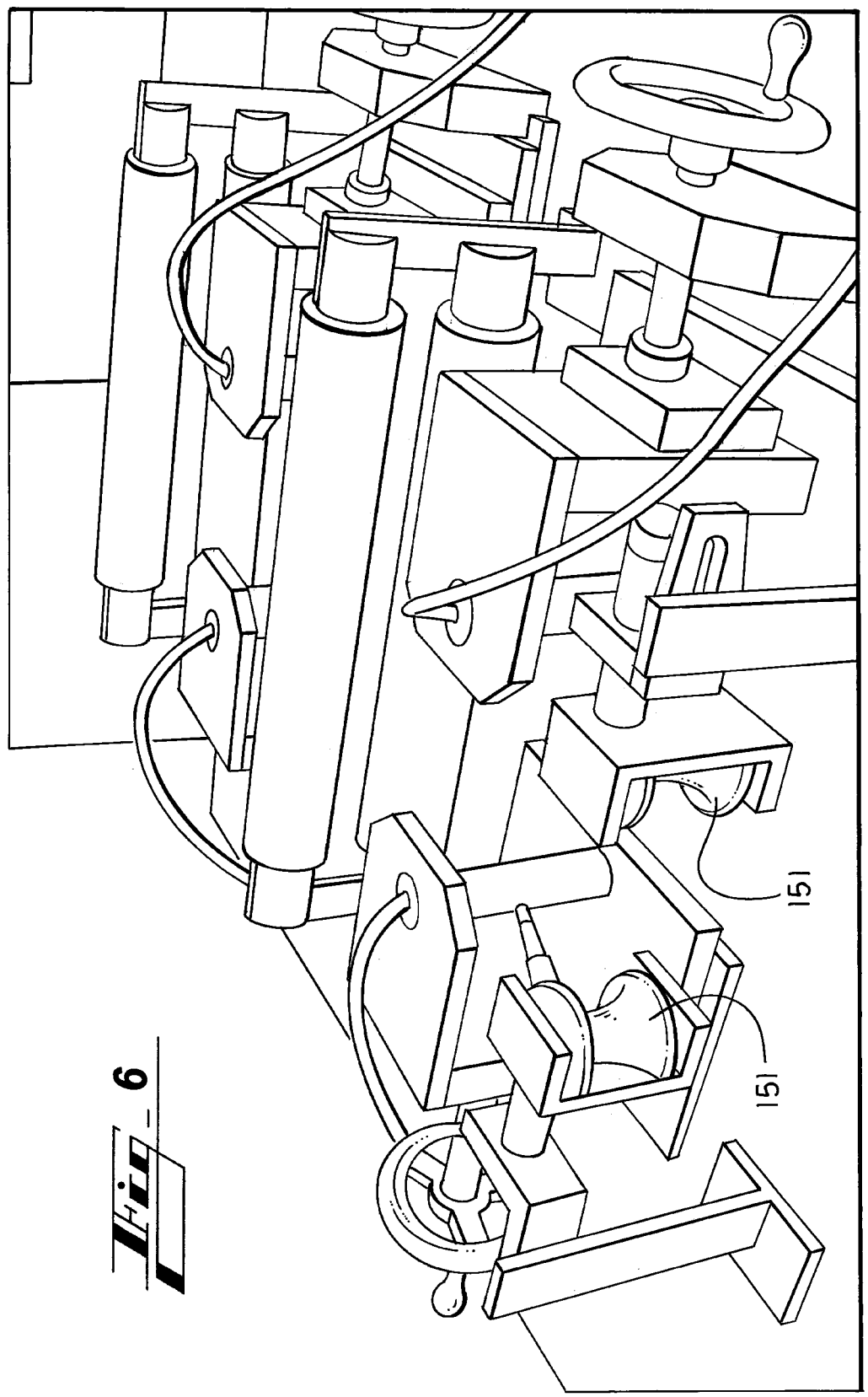
FIG. 6 illustrates a perspective view of a side edge sealing system with multiple pairs of stationary side sealing units and multiple puller rollers and also including a pair of corner shaping spools, according to one embodiment of the invention.

Referring to FIGS. 5 and 6, in one embodiment the corner shapers 150 may be spool-shaped units 151 so that the curvature of the unit 151 provides desirable interaction at the corners of sealed edges 55 of a board 50 of the invention. Preferably the spools 151 are free floating and are not heated, and can move up and down to "soften" the sharp corners. The spools 151 are preferably stationary and do not spin, but apply drag or friction between the surface of the spool 151 and the corner of the board 50.

Figure 4:
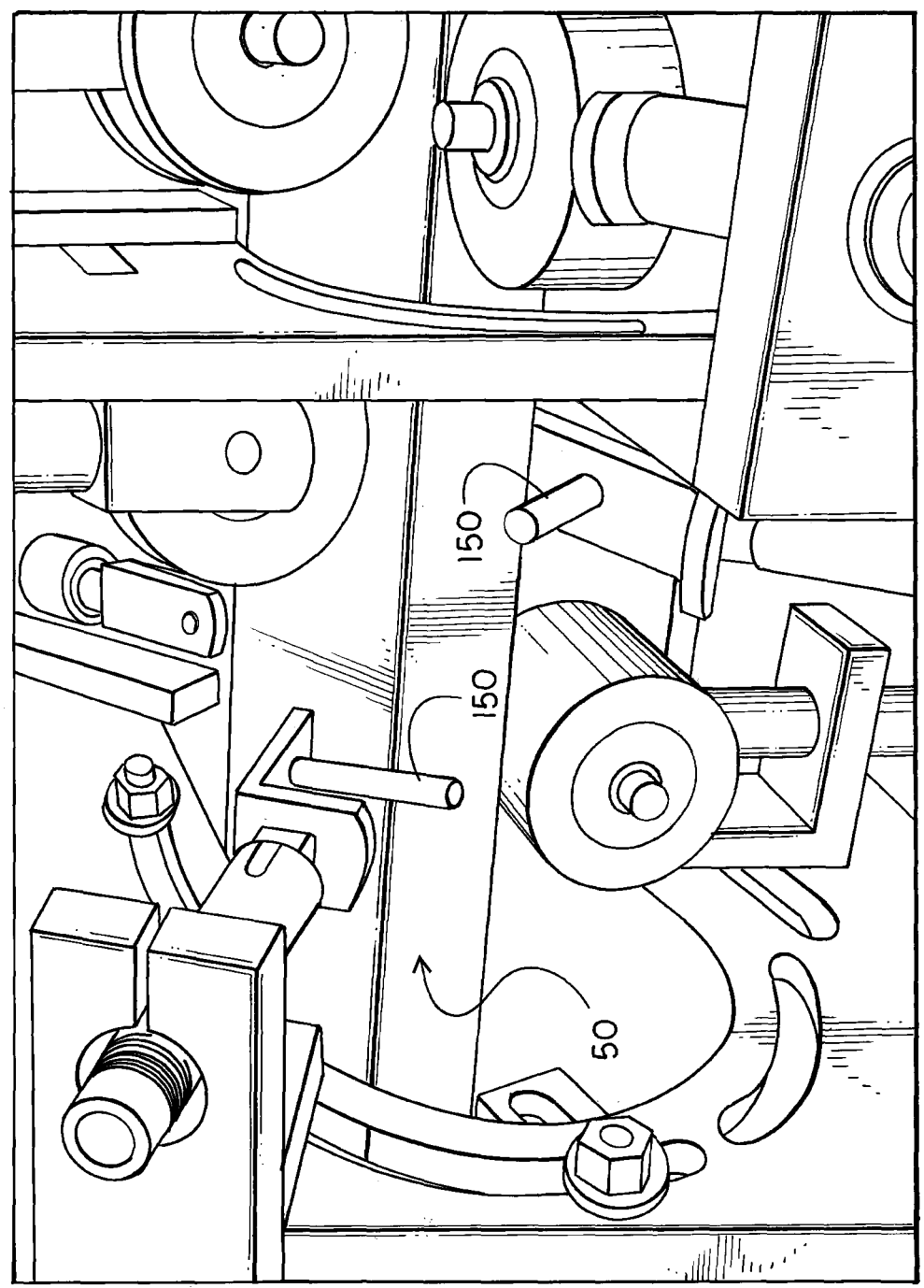
FIG. 4 illustrates a perspective view of two pairs of angled corner shaping units pushing the warm corners of a board being pulled by puller roller after the board's exit from between a pair of stationary side sealing units in one embodiment of the invention.

In alternative embodiments, such as shown in FIGS. 3 and 4, a corner shaping element 150 has a small, stationary metal bar/rod that is about 45 degrees to each corner to eliminate a sharp edge from forming at the corners of the board edges 55 during the sealing process. The corner shaping element 150 with angled bar provides similar corner shaping functions as the spool 151, but the angled bar/rod will contact the corner of every thickness board (½", ⅝", ¾" and 1") at the same angle whereas the radius of the spool 151 causes boards 50 of different thicknesses to contact the spool 151 at different points and hence the angle of the contact surface for the spool 151 is not constant from one thickness to another.

In alternative embodiments of the invention shown in FIGS. 7 and 8, a sturdier sealing system is utilized with the components of the invention to provide improved performance of edge sealing, including good results at faster foot-per-minute run rates with less pressure between sealing elements. More sealing head elements 100 can also be provided in a more rigid machine. Specifically the size of the machine frame, and the mechanisms holding the sealing units 105 were made physically larger, and with thicker metal, so there is much less bending or flexing of the structure of the machine. It was found that the more rigid machine and the additional sealing head elements 100 allowed using less pressure and run at higher rates and achieve good quality sealed edges 55 that were only achieved with lower run rates on an alternative and less sturdy development machine. With the more rigid machine and five pairs of sealing head elements 100, the following conditions in "Table A," with the pairs of sealing elements numbered in order encountered by the board edges 55, below permitted run rates of 120-160 fpm with little noticeable difference in surface finish as the run rate is increased:

TABLE A

| SEALING ELEMENT PAIR | TEMPERATURE (° F.) | PRESSURE (INTERFERENCE) |
| --- | --- | --- |
| 1 | 475 | 0.035" |
| 2 | 465 | 0.035" |
| 3 | 120 | 0.035" |
| 4 | 120 | 0.035" |
| 5 | 120 | 0.035" |

It is expected that a sturdy machine with five pairs of sealing elements 100 as described in the foregoing embodiment could be run at 200 ft/min with good sealed edges 55.

As further shown in FIGS. 7 and 8, in preferred embodiments, sealing head elements 100 are connected to dovetail guide blocks 180 that enable the sealing head elements 100, and respective sealing units 105, to be moved forward and backward as a respective guide block 180 is moved within a corresponding guide channel of the machine frame. It will be appreciated that moving a guide block 180 and corresponding sealing head element 100 will increase or decrease the distance between a pair of sealing head elements 100 to provide desired friction and compression for achieving desired sealing results of a board 50 with a particular thickness. It will also be appreciated that one sealing head element 100 of a pair could be provided with a guide block 180 for movement and establishing the distance between a pair of sealing units 105, or each sealing head element 100 in a pair could each be provided with a corresponding guide block 180.

In the preceding specification, various embodiments have been described with reference to the accompanying drawings. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than restrictive sense.

What is claimed is:

1. A method of sealing a cut edge of a polymer board comprising:
   automatically advancing a polymer board including opposite cut edges, wherein the opposite cut edges comprise cellular polyvinyl chloride; and
   contacting and compressing opposite cut edges of the board with an opposite pair of stationary, non-spinning and heated elements having rounded or cylindrical surfaces to seal each of the opposite cut edges into a skin.

2. A method of sealing a cut edge of a polymer board comprising:
   automatically advancing a polymer board including opposite cut edges;
   heating the opposite cut edges; and
   contacting and compressing the opposite cut edges with multiple opposite pairs of stationary, non-spinning elements having rounded or cylindrical surfaces to seal each of the opposite cut edges into a skin, wherein different pairs of stationary, non-spinning elements having rounded or cylindrical surfaces are heated to different temperatures.

3. A method of sealing a cut edge of a polymer board comprising:
   automatically advancing a polymer board including opposite cut edges;
   heating the opposite cut edges; and
   contacting and compressing the opposite cut edges with multiple opposite pairs of stationary, non-spinning elements having rounded or cylindrical surfaces to seal each of the opposite cut edges into a skin, wherein one pair of stationary, non-spinning elements having rounded or cylindrical surfaces is heated and another subsequent pair of stationary, non-spinning elements having rounded or cylindrical surfaces cold works the opposite cut edges of the board.

4. A method of sealing a cut edge of a polymer board comprising:
   automatically advancing a polymer board including opposite cut edges;
   heating the opposite cut edges; and
   contacting and compressing the opposite cut edges with multiple opposite pairs of stationary, non-spinning elements having rounded or cylindrical surfaces to seal each of the opposite cut edges into a skin, wherein a second subsequent pair of stationary, non-spinning elements having rounded or cylindrical surfaces has a lower temperature and provides more compressing pressure to the opposite cut edges of the board than a first preceding pair of stationary, non-spinning elements having rounded or cylindrical surfaces.

5. A method of sealing a cut edge of a polymer board comprising:
   automatically advancing a polymer board including a cut edge;
   heating the cut edge;
   contacting and compressing the cut edge with a stationary, non-spinning element having a rounded or cylindrical surface to seal the cut edge into a skin; and
   contacting and pushing a corner of the cut edge of the board with a stationary corner shaping element to provide a more rounded corner.

6. The method of claim 5, wherein the corner shaping element is an angled rod or spool-shaped element.

7. The method of claim 6, wherein the corner shaping element is spool-shaped and the spool-shaped element floats up and down without spinning.

8. The method of claim 6, wherein the corner shaping element is heated.

9. The method of claim 5, wherein the corner shaping element is heated.

10. A method of sealing a cut edge of a polymer board comprising:
    automatically advancing a polymer board including opposite cut edges;
    heating the opposite cut edges; and
    contacting and compressing the opposite cut edges with multiple opposite pairs of stationary, non-spinning elements having rounded or cylindrical surfaces to seal each of the opposite cut edges into a skin, wherein a second pair of stationary, non-spinning elements are distanced to provide more compressing pressure to the opposite cut edges of the board than a preceding first pair of stationary, non-spinning elements that are further distanced apart than the second pair.

11. A method of sealing a cut edge of a polymer board comprising:
    automatically advancing a polymer board including opposite cut edges, wherein the opposite cut edges comprise cellular polyvinyl chloride;
    heating the opposite cut edges;
    contacting and compressing opposite cut edges of the board with an opposite pair of stationary, non-spinning and heated elements having rounded or cylindrical surfaces to seal each of the opposite cut edges into a skin; and
    contacting and pushing opposite corners of the opposite cut edges of the board with one or more pairs of stationary corner shaping elements to provide more rounded corners.

12. The method of claim 11, wherein the one or more pairs of stationary corner shaping elements include a pair of angled rods or spool-shaped elements.

13. The method of claim 11, further comprising heating a pair of stationary corner shaping elements during contacting and pushing of the opposite corners of the opposite cut edges of the board.

* * * * *